July 22, 1930.    M. G. T. PRIEST    1,771,348
BRAKE FOR MACHINERY, VEHICLES, AND THE LIKE
Filed May 4, 1928

INVENTOR
Martin G. T. Priest
by Langner, Parry, Card and Langner
Att'ys.

Patented July 22, 1930

1,771,348

UNITED STATES PATENT OFFICE

MARTIN GEORGE TURNER PRIEST, OF PUNIHO, NEW ZEALAND, ASSIGNOR TO PRIEST'S BRAKE DEVELOPMENT COMPANY LIMITED, NEW PLYMOUTH, NEW ZEALAND

BRAKE FOR MACHINERY, VEHICLES, AND THE LIKE

Application filed May 4, 1928, Serial No. 275,164, and in New Zealand September 15, 1927.

This invention relates to brakes for machinery, vehicles and the like, and particularly to brakes of that kind which operate by a wedging action, and its object is to provide an improved form of brake of the kind above mentioned, and one which is easily operated, simple of construction, will not readily get out of order and whereby considerable braking effect may be obtained, with a minimum of effort or strain.

According to the invention the improved form of brake comprises a drum rotatable with a member to be braked; a disc in said drum fixed against rotation; segments disposed around the interior of the drum and held against rotation by stops on the fixed disc; cams in said drum engaging inner surfaces of the segments, and a brake ring within the drum capable of being given turning movement to obtain a wedging action through the cams, whereby the segments are forced outwards to produce frictional resistance to the rotation of the drum.

Preferably a loosely fitted lining ring held against rotation is placed between the segments and the internal surface of the drum, to take wear and facilitate adjustment of the brake which becomes necessary, owing to said wear.

The drum can be oil tight, and be filled with oil in which the working parts operate, or it may be fitted with an ordinary lining and be run dry.

In the accompanying drawing in conjunction with which the invention will be more fully described.

Figure 1:
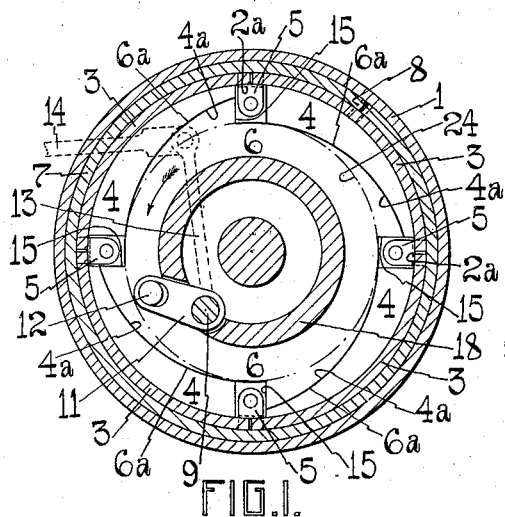

Figure 1 is a sectional elevation and

Figure 2:
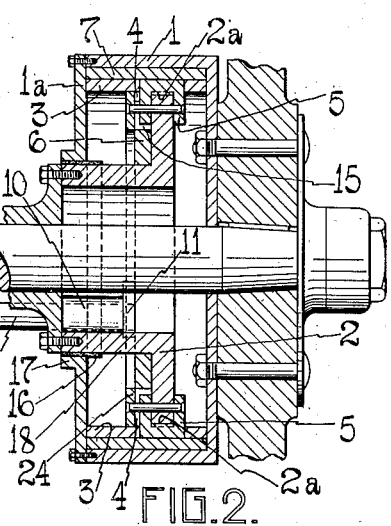
Figures 3, 7:
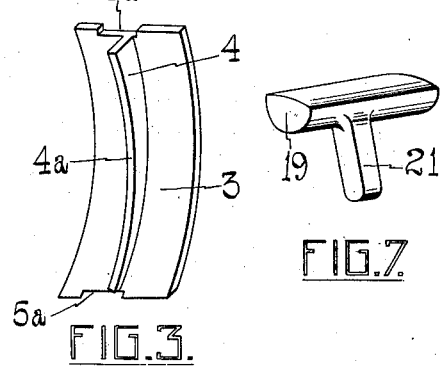
Figure 4:
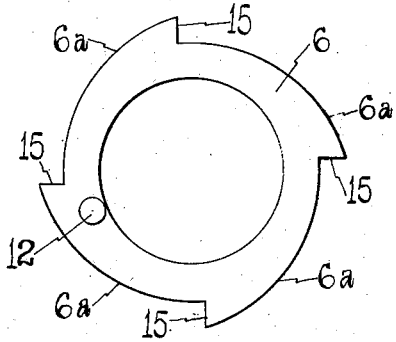

Figure 2 a cross sectional elevation of the improved brake while,

Figure 3 is a perspective view of one of the segments,

Figure 4 an elevation of the brake ring and

Figure 6:
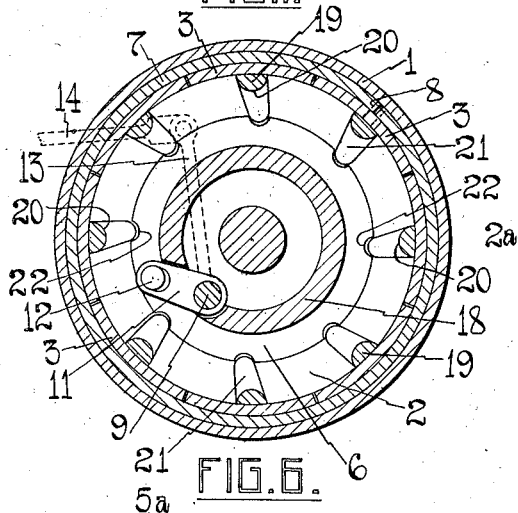
Figure 5:
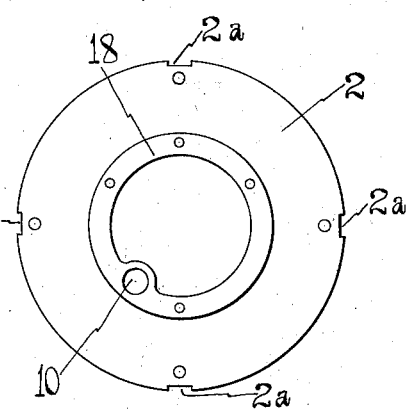

Figure 5 an elevation of the fixed disc,

Figure 6 being a sectional elevation illustrating a modification, and

Figure 7 a detail view of one of the cams used in the form shown in Figure 6.

In the drawing 1 is the drum which is fitted so as to rotate with the shaft, wheel or other part the rotation of which it is desired to check, or to prevent altogether, while 2 is the fixed disc which is located within the drum 1 and is fitted to a nonrotary part, such as for instance, the housing of the rear axle of a motor vehicle.

Segments 3 shaped to conform to the interior curve of the drum 1 are disposed around the interior of the latter, said segments being inserted between the edge of the disc 2, and the circular rim of the drum, and each having an inwardly extending rib 4 located at one side of the fixed disc 2.

Spaces formed by recessing adjacent ends of the segments 3 as at 5ª (Figure 3) are occupied by stops 5 which extend on each side of the disc 2 and are checked therein at 2ª (Figure 5) said stops 5 serving to hold the segments 3 against rotation.

The inner edges 4ª of the ribs 4 of the segments 3, are each curved to serve as cam surfaces as shown, while the brake ring 6 which is disposed inside the segments 3, and surrounds a ring 18 projecting from the disc 2 has formed on its outer edge surfaces 6ª curved to serve as cams and adapted to engage the cam surfaces or inner edges 4ª of the ribs 4 of the segments 3.

Thus by imparting turning movement in the direction indicated by the arrow, to the ring 6 on the ring 18, a wedging action is obtained at four separate locations spaced equally around the drum, whereby the four segments 3 are simultaneously thrust or forced outwards, to either themselves make contact with the interior surface of the circular rim of the drum 1, or to expand into contact with said rim, a split metal ring 7 held against rotation by a stop 8, which may be a cross key on one of the segments 3.

It is preferred to use the split metal ring 7 as the latter gives an all round contact with the interior of the drum rim, besides which said ring takes the wear, and when worn, it being simply loosely placed on the stop 8 its removal and replacement is a comparatively easy matter.

To enable turning movement to be imparted to the brake ring 6 on the ring 18, a short shaft 9 is mounted in a bearing 10 on the fixed disc 2, said shaft having keyed thereon a slotted arm 11 the slot of which passes upon a pin 12 projecting from the ring 6, the shaft 9 being made to extend from the drum 1 and having secured on its outer end a lever 13 (shown dotted) which may be either a hand or foot lever, or be connected by a rod 14 (also shown dotted) with a hand or foot lever not shown.

By operating the lever 13 the shaft 9 can be given partial turning movement in one direction to turn the ring 6 in the direction indicated by the arrow, to obtain the wedging action between the cam surfaces 4ª and 6ª, whereby the segments 3 are forced outwards and frictional resistance is offered to the rotating drum 1, either by the segments 3 themselves, or by the split ring 7, and according to the degree of outward pressure exerted by said segments 3, so is the friction sufficient to either merely, retard the rotation of the drum 1 and its attached member, or to prevent rotation entirely.

Turning movement of the ring 6 in the direction the reverse to that indicated by the arrow, reduces the wedging action and permits the segments 3 to contract and relieve the drum 1 of the frictional resistance, said reverse turning movement of said ring 6 being limited by the stops 15 on the latter engaging the stops 5 on the fixed disc 2.

As comparatively little movement of the ring 6 is required to produce sufficient wedging action between the cam surfaces 4ª and 6ª in order to obtain the desired braking effect, the distance between the shaft 9 and pin 12 is enabled to be reduced to a minimum, which means that with a comparatively short lever 13, considerable power can be transmitted to force the segments 3 outwards, thereby rendering the brake powerful with little effort by the operator.

The drum 1 may be made oil tight by the addition of a cover 1ª and the working parts made to operate in oil, although said drum can be run dry with an ordinary lining. Also in order to prevent the escape of oil (when the latter is used) from the drum 1 and also to prevent as far as possible the entrance of dirt thereto, a felt washer 16 is inserted between the ring 18 extending from the fixed disc 2 and a boss 17 on the cover 1ª and made to rotate with the drum, said washer 16 being made to extend slightly into the drum and having a screw thread formation thereon which tends to force the oil contained in the drum inwards, and to force outwards any dirt having a tendency to enter said drum.

In order to prevent side play of the segments 3 within the drum, a keeper ring 24 adapted to engage the ribs 4 of the said segments is secured to the stops 15.

In the alternative form of the invention shown in Figure 6 the ribs 4 and the cam surfaces 6ª on the brake ring 6 are dispensed with, and in order to obtain the outward thrust or expansion of the segments 3, cams 19 turnable in recesses 20 in the edge of the fixed disc 2, are provided said cams extending across the full width of the drum 1 and being formed with or having secured thereon arms 21 the inner ends of which are entered in recesses 22 in the brake ring 6 which is turnable as before on the ring 18 of the disc 2.

It will be seen that with the construction shown in Figure 6, upon the brake ring 6 being given turning movement the arms 21 will be operated so as to turn the cams 19 in the recesses 20, and force the segments 3 outwards, or allow them to move inwards, according to the disposition of the surfaces of the cams in relation to the segments 3 at the time of turning said cams.

What I do claim and desire to obtain by Letters Patent of the United States is:—

1. A brake, comprising a hollow drum rotatable with a member to be braked; a disc in said drum fixed against rotation; stops on said discs; segments disposed around the interior of said drum and held against rotation by said stops; cams in said drum engaging inner surfaces of the segments; a brake ring within the drum capable of being given a turning movement to obtain a wedging action through the cams whereby the segments are forced outwardly to produce frictional resistance to the rotation of the drum; means for imparting a turning movement to said brake ring; a split, loosely-fitting metal ring inserted between the drum and the segments; and means on one of the segments engaging said split ring to prevent turning thereof, whereby when the segments are forced outwardly to produce frictional resistance, they will engage the split ring which in turn will transmit the braking action to the drum.

2. A brake, comprising a hollow drum rotatable with a member to be braked; a disc in said drum fixed against rotation; stops on said disc; segments disposed around the interior of said drum and held against rotation by stops; cams in said drum engaging inner surfaces of the segments; a brake ring within the drum, capable of being given a turning movement to obtain a wedging action through the cams whereby the segments are forced outwardly to produce frictional resistance to the rotation of the drum, and means for imparting a turning movement to said brake ring, comprising a shaft mounted on the disc; an actuating lever secured to said shaft; a slotted arm also mounted on said shaft; and a pin on said ring with which said slotted arm engages to transmit the motion of the shaft, when rocked by the actuating lever, to the ring.

3. A brake comprising a hollow drum rotatable with a member to be braked, an oil-tight cover about said drum; a disc in said drum fixed against rotation; stops on said disc; segments disposed around the interior of said drum and held against rotation by said stops; cams in said drum engaging inner surfaces of the segments; a brake ring within the drum, capable of being given a turning movement to obtain a wedging action through the cams whereby the segments are forced outwardly to produce frictional resistance to the rotation of the drum; means for imparting a turning movement to the said brake ring; lubricating oil in said oil-tight drum; and a sealing washer between the oil-tight cover and the disc, for preventing escape of the oil.

4. A brake comprising a hollow drum rotatable with a member to be braked, an oil-tight cover about said drum; a disc in said drum fixed against rotation; stops on said disc; segments disposed around the interior of said drum and held against rotation by said stops; cams in said drums engaging inner surfaces of the segments; a brake ring within the drum, capable of being given a turning movement to obtain a wedging action through the cams whereby the segments are forced outwardly to produce frictional resistance to the rotation of the drum; means for imparting a turning movement to the said brake ring; lubricating oil in said drum; and a sealing washer between the oil-tight cover and the disc for preventing escape of the oil, the said washer having a screw thread formation arranged on the exterior thereof fitting inwardly, whereby it tends to force the oil inwardly of the drum and to force outwardly any dirt having a tendency to enter said drum.

In testimony whereof I affix my signature.

MARTIN GEORGE TURNER PRIEST.